O. L. HUFFMAN.
FARM GATE.
APPLICATION FILED JUNE 12, 1911.
1,012,357.
Patented Dec. 19, 1911.
2 SHEETS—SHEET 1.
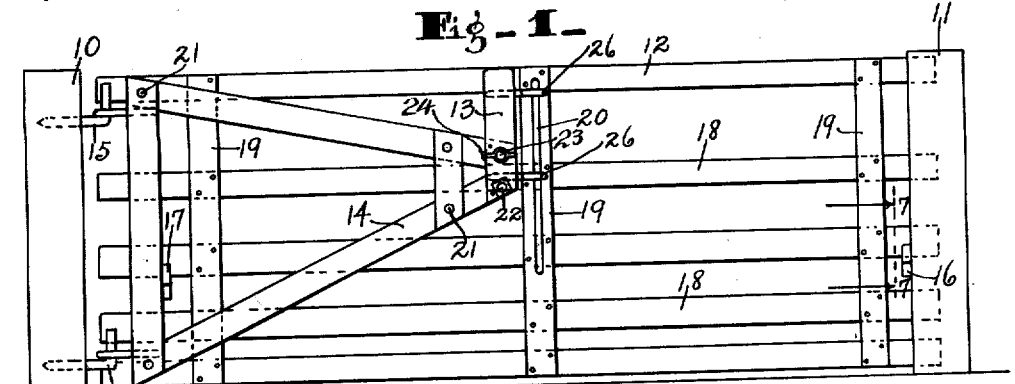
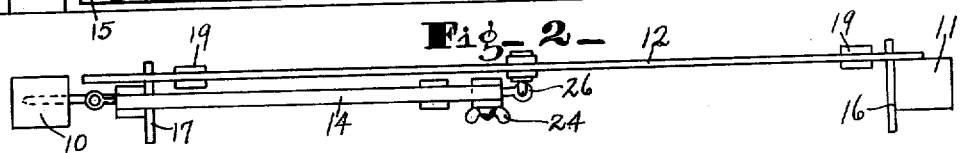
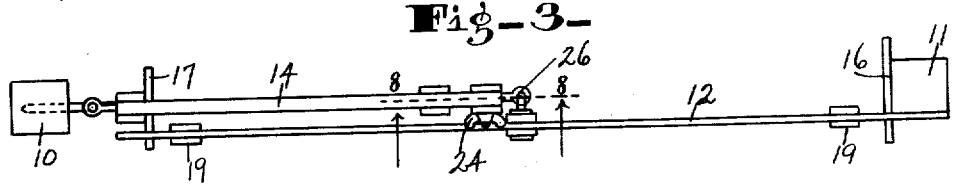
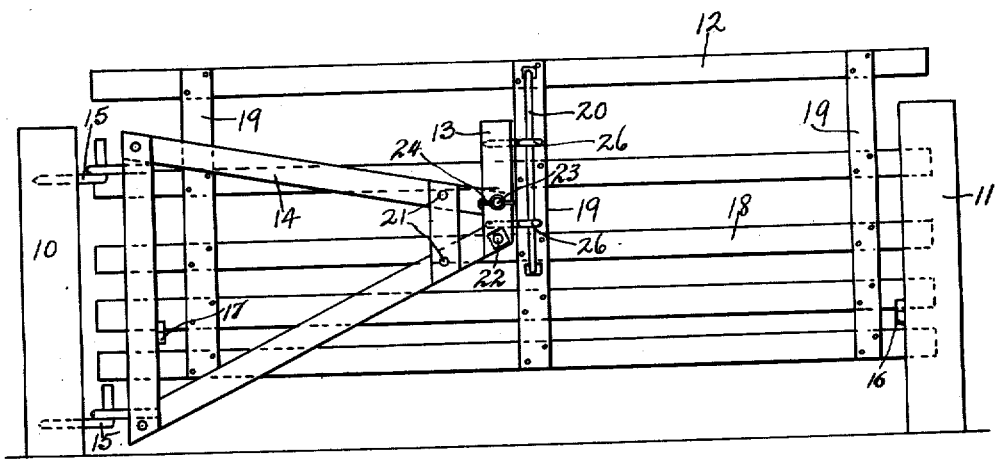
WITNESSES:
E. A. Mayo.
O. M. McLaughlin
INVENTOR.
Orla L. Huffman.
BY V. H. Fortwood
ATTORNEY.

O. L. HUFFMAN.
FARM GATE.
APPLICATION FILED JUNE 12, 1911.
1,012,357.
Patented Dec. 19, 1911.
2 SHEETS—SHEET 2.
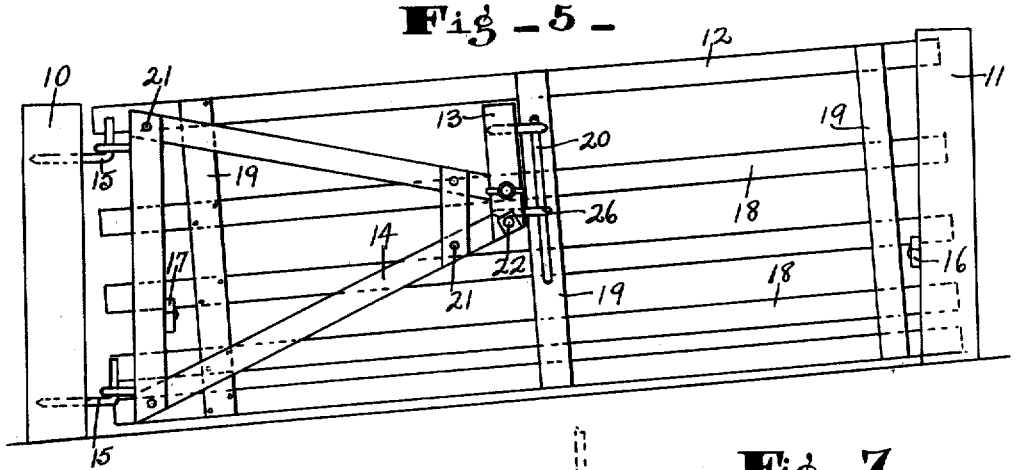
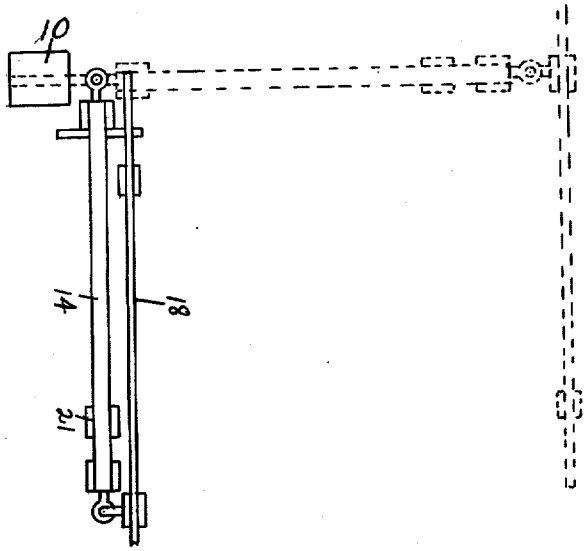
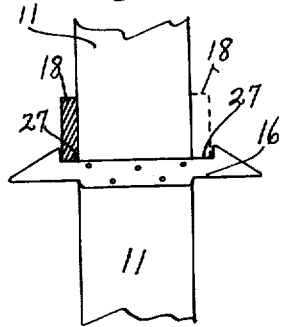
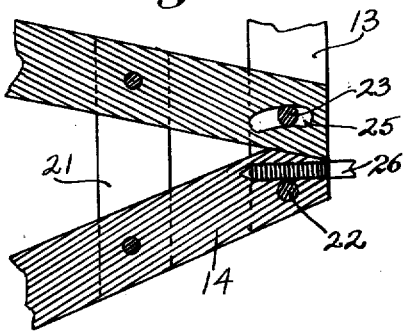
WITNESSES:
E. H. Mayo.
O. M. McLaughlin
INVENTOR.
Orla L. Huffman.
BY
ATTORNEY.

UNITED STATES PATENT OFFICE.

ORLA L. HUFFMAN, OF ALBANY, INDIANA.

FARM-GATE.

1,012,357.

Specification of Letters Patent.

Patented Dec. 19, 1911.

Application filed June 12, 1911. Serial No. 632,774.

*To all whom it may concern:*

Be it known that I, ORLA L. HUFFMAN, of Albany, county of Delaware, and State of Indiana, have invented a certain useful Farm-Gate; and I do hereby declare that the following is a full, clear, and exact description thereof, reference being had to the accompanying drawings.

The object of this invention is to provide an improved farm gate of such construction that it will prevent sagging of the members and having adjusting means whereby said gate may be adjusted to meet the requirements of the farm.

The chief feature of this invention lies in hanging a gate midway between its ends on a crane or supporting member which in turn is hinged and supported on a fence post in such a manner that the gate may be adjusted for use on a sideling road or may be elevated to allow small animals to pass through the gate way and yet prevent the passage of larger animals.

The nature of the invention will be understood from the accompanying drawings and the following description and claim.

In the drawings Figure 1 is a front elevation of the gate and means for hanging the same showing the gate latched on the far side of the gate post. Fig. 2 is a plan view of the same. Fig. 3 is a plan view of the gate showing the same latched on the side of the post nearest to the observer. Fig. 4 is a view similar to that in Fig. 1, but showing the gate held in an elevated position. Fig. 5 shows the gate adjusted for use on a hillside or inclined roadway. Fig. 6 shows the gate in an open position with parts broken away and a position in opening the same shown by dotted lines. Fig. 7 is a section on the line 7—7 of Fig. 1, with parts broken away, showing the latch feature. Fig. 8 is a section on the line 8—8 of Fig. 3, showing the pivoting and adjusting feature on the crane member.

In detail there is shown in the drawings a gate opening formed by posts 10 and 11 adapted to be closed by a gate member 12 hinged midway between its ends to an adjusting member 13 secured on a triangularly-shaped crane member 14 which in turn is movably secured to the fence post 10 by hinges 15, and secured in a closed position by means of the latch members 16 and 17 rigidly secured to the post 11 and the vertical member of the crane member 14, respectively.

The gate 12 is formed of horizontal bars 18 and vertical end and center bars 19 rigidly secured thereto. A rod 20 is secured to said center bar 19 by having its ends bent at right angles and inserted through said vertical center bar and is secured by means of nuts, shown in Figs. 2 and 3, to said center bar in such a manner that the vertical portion of said bar is held away from the gate by substantially the thickness of the gate.

The crane member 14 is substantially triangular in shape with its members rigidly secured together by means of bolts 21. The base of this crane member is mounted on the post 10, as before stated, by means of pin and socket butts 15 and near the apex of the triangle the adjusting member 13 is pivotally mounted by means of a bolt 22, while a second bolt 23 with a thumb nut 24 thereon provides means for locking said adjusting bar in any desired position. Said bolt 23 extends through holes drilled in said adjusting bar 13 and has play concentric with the bolt 22 in an arced slot 25 in the member 14. In a normal setting of the gate the adjusting member 13 will extend in a line substantially parallel with the end or base member of the crane 14 and the post 10.

Inserted at the upper and lower ends of the supporting member 13 are loop bolts 26 which surround the vertical rod 22 on the gate member and allows said rod to move freely therein. This rod 20 is shown positioned on the gate with the upper bent end thereof resting on the upper loop bolt 26. Thus the weight of the gate will be borne first by the adjusting member 13 and through the crane member said weight will be brought on the hinges 15.

The gate may be held in a closed position by means of the latches 16 and 17, before mentioned. These latches are of the same general shape, as shown in detail in Fig. 7, although the latch 16 is somewhat longer than the latch 17. Said latch 16 is secured to the post 11 and extends beyond it on either side and has an upward trigger-like projection on either end providing a recess 27 on each side thereof of sufficient width that one of the horizontal bars of the gate may be held therein.

In order that the gate may be adjusted for use on a hillside or to allow small stock to pass through, the thumb screw 24 on the adjusting member 13 is loosened. Thus either end of the gate may be raised to any desired position. This will cause the adjusting member 13 to swivel about the bolt 22 and when the gate has been raised to the desired position, the thumb nut 24 can be tightened and the adjusting member 13 held in that position, as shown in Fig. 5. This same means may also be used to take up any sag which may occur in the gate member. This moving or elevating of one end of the gate may also be used for a different purpose. Said thumb screw may be loosened and one end of the gate raised and one of the lower horizontal bars 18 may be caught over the latch 16 and thus small animals may be allowed to pass through the gate. Another way to accomplish this same result would be to raise the entire gate, as shown in Fig. 4, and latch one of the lower horizontal members 18 on the latches 16 and 17 without slacking the nut 24. Either of these two positions would allow small stock to pass through the gateway but would prevent the larger animals from passing through.

The gate may be operated as follows: One end of the gate is elevated slightly to enable the horizontal bar to be released from the catch member, thus fulcruming the gate on the opposite latch member. A downward pressure on the free end of the gate would then cause the gate to be fulcrumed about the upper supporting loop bolt 26 and the opposite end of the gate would be released from its latch member. This rocking movement of the gate is permitted by the loose fit between the loop bolts 26 and the rod 22. The gate is then swung sufficiently that the horizontal bars 18 may clear the post 11 after which the gate may be opened in either direction. Thus, as seen in Fig. 6, after the horizontal bars have cleared the post 11 the gate member is swung substantially at right angles to the crane member and thereafter the gate may be moved in either direction to cause its complete opening. Thus the gate may be opened away from a team no matter from which side the team approaches. While the gate is open the horizontal bar may be latched over the latch 17 although this is not necessary and to do so would not necesasrily hold the gate in an open position. In closing, the reverse motions would be gone through and the gate may be latched on either side of the post, as shown in Figs 2 and 3.

I claim as my invention:

A gate, a gate post, a triangular support pivoted at its large end to the gate post and having a substantially horizontal slot at its free end, a vertical bar pivoted to the free end of the said support, a clamping means extending through said bar and the slot in said support for adjustably clamping the bar in place, eye bolts in said bar one above the other, and a rod extending through said eye bolts and secured centrally to said gate.

In witness whereof, I have hereunto affixed my signature in the presence of the witnesses herein named.

ORLA L. HUFFMAN.

Witnesses:
G. H. BOINK,
O. M. McLAUGHLIN.

---

Copies of this patent may be obtained for five cents each, by addressing the "Commissioner of Patents. Washington. D. C."